(12) United States Patent
Fieldman

(10) Patent No.: US 10,375,059 B1
(45) Date of Patent: Aug. 6, 2019

(54) ACCOUNT SHARING PREVENTION IN ONLINE EDUCATION

(71) Applicant: Study Social, Inc., Gainesville, FL (US)

(72) Inventor: Ethan Fieldman, Gainesville, FL (US)

(73) Assignee: STUDY SOCIAL, INC., Gainesville, FL (US)

(*) Notice: Subject to any disclaimer, the term of this patent is extended or adjusted under 35 U.S.C. 154(b) by 149 days.

(21) Appl. No.: 15/064,207

(22) Filed: Mar. 8, 2016

Related U.S. Application Data

(60) Provisional application No. 62/151,858, filed on Apr. 23, 2015.

(51) Int. Cl.
| | |
|---|---|
| H04L 9/00 | (2006.01) |
| H04L 29/06 | (2006.01) |
| G09B 5/00 | (2006.01) |

(52) U.S. Cl.
CPC .............. H04L 63/083 (2013.01); G09B 5/00 (2013.01); H04L 63/102 (2013.01)

(58) Field of Classification Search
CPC .................................................... H04L 63/083
(Continued)

(56) References Cited

U.S. PATENT DOCUMENTS

| | | |
|---|---|---|
| 6,256,793 B1 | 7/2001 | Skopp |
| 6,652,287 B1 | 11/2003 | Strub |

(Continued)

FOREIGN PATENT DOCUMENTS

| | | |
|---|---|---|
| WO | W0-0129733 | 4/2001 |

OTHER PUBLICATIONS

Unknown author, (Mar. 25, 2015). Snapshot of Coursehero.com. Retrieved from https://web.archive.org/web/20150325180238/https://www.coursehero.com/ on Oct. 2, 2017.*

(Continued)

*Primary Examiner* — Alexander Lagor
*Assistant Examiner* — Syed M Ahsan
(74) *Attorney, Agent, or Firm* — Beyer Law Group LLP

(57) ABSTRACT

A user may only log into an education application using login credentials of a third-party social media site. A browser is redirected to a server computer of the site which authenticates the user's credentials. The server confirms to the education application which displays its contents on the computer and allows the user to access the education application. Or, the user selects a mobile application on a telephone which connects to the server of the site. The site authenticates the user's credentials and sends a confirmation back to the mobile application. The mobile application connects to the education application and allows it to display its contents on the telephone. Alternatively, an actual minimum number of links is required before access is granted to the education application which is greater than a stated minimum. Attempting to log into the education application with fewer than the stated minimum results in a warning message and access is not granted. Attempting to log into the education application with greater than the stated minimum but fewer than the actual minimum results in a different warning message and access is not granted without further verification.

38 Claims, 10 Drawing Sheets

(58) Field of Classification Search
USPC .......................................................... 726/7
See application file for complete search history.

(56) References Cited

U.S. PATENT DOCUMENTS

| | | | |
|---|---|---|---|
| 6,988,138 | B1 | 1/2006 | Alcorn |
| 8,352,876 | B2 | 1/2013 | Batarseh |
| 8,661,461 | B1 | 2/2014 | Maurer |
| 9,021,607 | B2 | 4/2015 | Chavez |
| 9,292,866 | B2 | 3/2016 | Allaire |
| 9,483,805 | B1 | 11/2016 | Fieldman |
| 9,560,034 | B1 | 1/2017 | Fieldman |
| 9,842,218 | B1 | 12/2017 | Brisebois |
| 2003/0208763 | A1 | 11/2003 | McElhatten |
| 2005/0144297 | A1 | 6/2005 | Dahlstrom |
| 2006/0129458 | A1 | 6/2006 | Maggio |
| 2006/0195604 | A1 | 8/2006 | Goodman |
| 2006/0253324 | A1 | 11/2006 | Miller |
| 2008/0140849 | A1 | 6/2008 | Collazo |
| 2008/0168515 | A1 | 7/2008 | Benson |
| 2008/0189617 | A1 | 8/2008 | Covell |
| 2009/0083048 | A1 | 3/2009 | Mandelbaum |
| 2009/0083777 | A1 | 3/2009 | St. John-Larkin |
| 2010/0050199 | A1 | 2/2010 | Kennedy |
| 2010/0083322 | A1 | 4/2010 | Rouse |
| 2010/0228613 | A1 | 9/2010 | Anderson |
| 2010/0251386 | A1 | 9/2010 | Gilzean |
| 2010/0325737 | A1 | 12/2010 | Fahn |
| 2011/0145908 | A1 | 6/2011 | Ting |
| 2011/0166918 | A1 | 7/2011 | Allaire |
| 2011/0208616 | A1 | 8/2011 | Gorman |
| 2011/0236872 | A1 | 9/2011 | Taylor |
| 2011/0247081 | A1 | 10/2011 | Shelton |
| 2011/0306027 | A1 | 12/2011 | Bridges |
| 2012/0054118 | A1 | 3/2012 | Griffin |
| 2012/0272336 | A1 | 10/2012 | Cohen |
| 2012/0304265 | A1* | 11/2012 | Richter ............... G06Q 10/00 726/7 |
| 2013/0004929 | A1 | 1/2013 | Otwell |
| 2013/0060661 | A1 | 3/2013 | Block |
| 2013/0152221 | A1 | 6/2013 | Yin |
| 2013/0191928 | A1 | 7/2013 | Yin |
| 2014/0038157 | A1 | 2/2014 | Karpoff |
| 2014/0103306 | A1 | 4/2014 | Moon |
| 2014/0128557 | A1 | 5/2014 | Giesbrecht |
| 2014/0157371 | A1 | 6/2014 | Le Chevalier |
| 2014/0188937 | A1 | 7/2014 | Kiefer |
| 2014/0201527 | A1 | 7/2014 | Krivorot |
| 2014/0214503 | A1 | 7/2014 | Chircorian |
| 2014/0279128 | A1 | 9/2014 | Sagebin |
| 2014/0282923 | A1 | 9/2014 | Narayan |
| 2014/0380509 | A1 | 12/2014 | Homer |
| 2015/0082461 | A1 | 3/2015 | Meredith |
| 2015/0156208 | A1* | 6/2015 | Kirkham ............... H04L 63/126 726/4 |
| 2015/0170535 | A1 | 6/2015 | Negash |
| 2015/0188941 | A1* | 7/2015 | Boshmaf ............. H04L 63/1441 726/22 |
| 2015/0193651 | A1 | 7/2015 | Gleim |
| 2015/0213236 | A1 | 7/2015 | Gorodyansky |
| 2015/0262496 | A1 | 9/2015 | Cook |
| 2015/0288692 | A1 | 10/2015 | Wei |
| 2015/0326583 | A1 | 11/2015 | Kouno |
| 2017/0140658 | A1 | 5/2017 | Aluvala |

OTHER PUBLICATIONS

Unknown author, (Dec. 2, 2014). Snapshot of Coursehero.com login page. Retireved from https://web.archive.org/web/20141202015424/https://www.coursehero.com/login.php on Oct. 2, 2017.*

Unknown author, (Mar. 25, 2015), Snapshot of Coursehero.com, Retrieved from https://web.archive.org/web/20150325180238/https://www.coursehero.com/ on Oct. 2, 2017 (Year: 2015).*

Unknown author, (Dec. 2, 2014), Snapshot of Coursehero.com, Retrieved from https://web.archive.org/web/20141202015424/https://www.coursehero.com/login.php on Oct. 2, 2017 (Year: 2014).*

U.S. Appl. No. 15/064,255, Ethan Fieldman, filed Mar. 8, 2015.

U.S. Appl. No. 15/639,740, Ethan Fieldman, filed May 26, 2016.

U.S. Appl. No. 15/893,239, Ethan Fieldman, filed Jun. 30, 2017.

U.S. Appl. No. 15/724,442, Ethan Fieldman, filed Feb. 9, 2018.

Ridley, M., "Lights, Tokens, Action!:" Sun, London, p. 24, Jun. 19, 2001.

Netflix—Unlimited Tv Shows & Movies: How Does It Work? Article dated Sep. 23, 2011 via Internet Archive (3 pages) http://web.archive.org/web/20110923163827/http://www.netflix.com:80/HowItWorkshttp://web.archive.org/web/20110923163827/http://www.netflix.com:80/HowItWorks.

Scott, Jeremy. "Netflix to Begin Enforcing One Stream Per Customer Rule" Published Sep. 7, 2011 (15 pages) http://tubularinsights.com/netflix-one-stream/.

Martin, David W. Netflix Adds a New Restriction: Limits Customers to One Stream at a Time Published Sep. 6, 2011 (10 pages) https://www.cultofmac.com/112468/netflix-adds-a-new-restriction-limits-customers-to-one-stream-at-a-time/.

Tuttle, Brad. "The Real Rules for Sharing Passwords at HBO Now, Netflix, Amazon Prime, and Hulu" Published Sep. 21, 2015 (4 pages) http://time.com/money/4043147/hbo-netflix-amazon-prime-share-account-password/.

Northcutt, Curtis et al. "Detecting and preventing 'multiple-account' cheating in massive open online courses" Computers & Education 100 (2016) (pp. 71-80).

"Managing Authentication—MoodleDocs" article published Mar. 18, 2016 (6 pages) https://docs.moodle.org/29/en/index.php?title=Managing_authentication&printable=yes.

William H. Rice IV. "Moodie E-learning Course Development: A complete guide to successful learning using Moodie" Published May 2006 (252 pages total).

Swett, C., "Play It Again, Zune: Microsoft's Portable Music Device Is Much Superior to last year's Model, but It Still Falls Short of Industry Leader iPod," McClatchy—Tribune Business News, Nov. 13, 2007.

Yuen-C, T., "High Rollers, but in a Virtual World," McClatchy—Tribune Business News, Oct. 28, 2010.

Https://scholar.google.com/scholar Controlling account access to streaming content based . . . —Google Scholar (2 pages).

Https://scholar.google.com/scholar Limiting user success to a maximum number of content (2 pages).

* cited by examiner

Authentication System

ACCOUNT SHARING PREVENTION IN ONLINE EDUCATION

CROSS-REFERENCE TO RELATED APPLICATIONS

This application claims priority of U.S. provisional patent application No. 62/151,858, filed Apr. 23, 2015, entitled "ACCOUNT SHARING DETECTION AND PREVENTION IN ONLINE EDUCATION," which is hereby incorporated by reference.

This application is related to U.S. patent application Ser. Nos. 15/064,255 and 15/064,292 filed on the same date herewith, entitled "ACCOUNT SHARING DETECTION IN ONLINE EDUCATION" and "LIMITED TOKENS AND LIMITED VIEWING TIME IN ONLINE EDUCATION," which are hereby incorporated by reference.

FIELD OF THE INVENTION

The present invention relates generally to online education. More specifically, the present invention prevents account sharing and other fraud in online education.

BACKGROUND OF THE INVENTION

Online education is a very promising approach to education and is primarily based upon the use of computers and mobile devices for learning, in addition to the use of other more traditional resources. Individual user accounts for students are often used to provide access, to track payments, to track progress, etc., but can be ripe for fraud. For example, students may attempt to share another student's account when each student preferably should use his or her own account. In other words, a student shares his or her valid account with another student who has not signed up nor paid for the service. Or, a number of students might attempt to share a fictitious account.

Account sharing is problematic and detrimental to learning, as account sharing creates a disincentive for the education provider to produce high quality material (due to the monetary pressures of server costs, curriculum specialists, programming time, etc.) and makes it costly for the education provider to continue to provide high-quality, high-time investment resources to students. This account sharing can lead to a proliferation, for instance, of subpar or generalized material. The cost of producing high quality, specialized material is high, and account sharing makes it untenable for education providers to continue to provide resources at a high level. This leads to a "race to the bottom," in which education providers offer generalized material or material that does not involve significant monetary or time investment on the part of the education provider. This in turn, affects the student, as the student will no longer receive the high quality service she or he initially anticipated. Furthermore, sharing accounts makes it difficult for the student to benefit from data-driven analytics that suggest the proper material or courses for a student, given the student's usage of the material and the student's performance. The student's learning experience is degraded and does not benefit from the strengths of online education, namely, personalization and quality of content.

In particular, it can be beneficial to prevent account sharing before it occurs, rather than try to detect it after the fact. Accordingly, improved techniques and systems are desired.

SUMMARY OF THE INVENTION

To achieve the foregoing, and in accordance with the purpose of the present invention, an online education system is disclosed that prevents account sharing using various techniques.

In a first technique, a user is only allowed to log into an education application by using their login credentials of a third-party social media site. When using a desktop computer, the computer's browser is redirected to a server computer of the social media site which authenticates the user's login credentials. The server computer then confirms authentication to the education application which then displays its contents on the user's computer and allows the user to access the services of the education application.

In an alternative embodiment of the first technique, a user selects a mobile application on their mobile telephone which then connects to the computer server of a social media site. The social media site authenticates the user's login credentials and sends a confirmation back to the mobile application. The mobile application then connects to the education application and allows it to display its contents on the user's telephone. Advantageously, the user is far less likely to share their login credentials with another student because these credentials uniquely identify the user on the social media site.

In a second technique, a user is informed that he or she must have a stated minimum number of "Friends" (or other personal user characteristic that can be quantified of a social media site) before access is granted to the education application. In reality, there is an actual minimum that is greater than the stated minimum. The actual minimum number of links is required before access is granted to the education application. Attempting to log in to the education application with fewer than the stated minimum result in a warning message reiterating the stated minimum and access is not granted. Attempting to log into the education application with greater than the stated minimum but fewer than the actual minimum results in a special (or different) error message and again, access is not granted, unless there is further verification.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
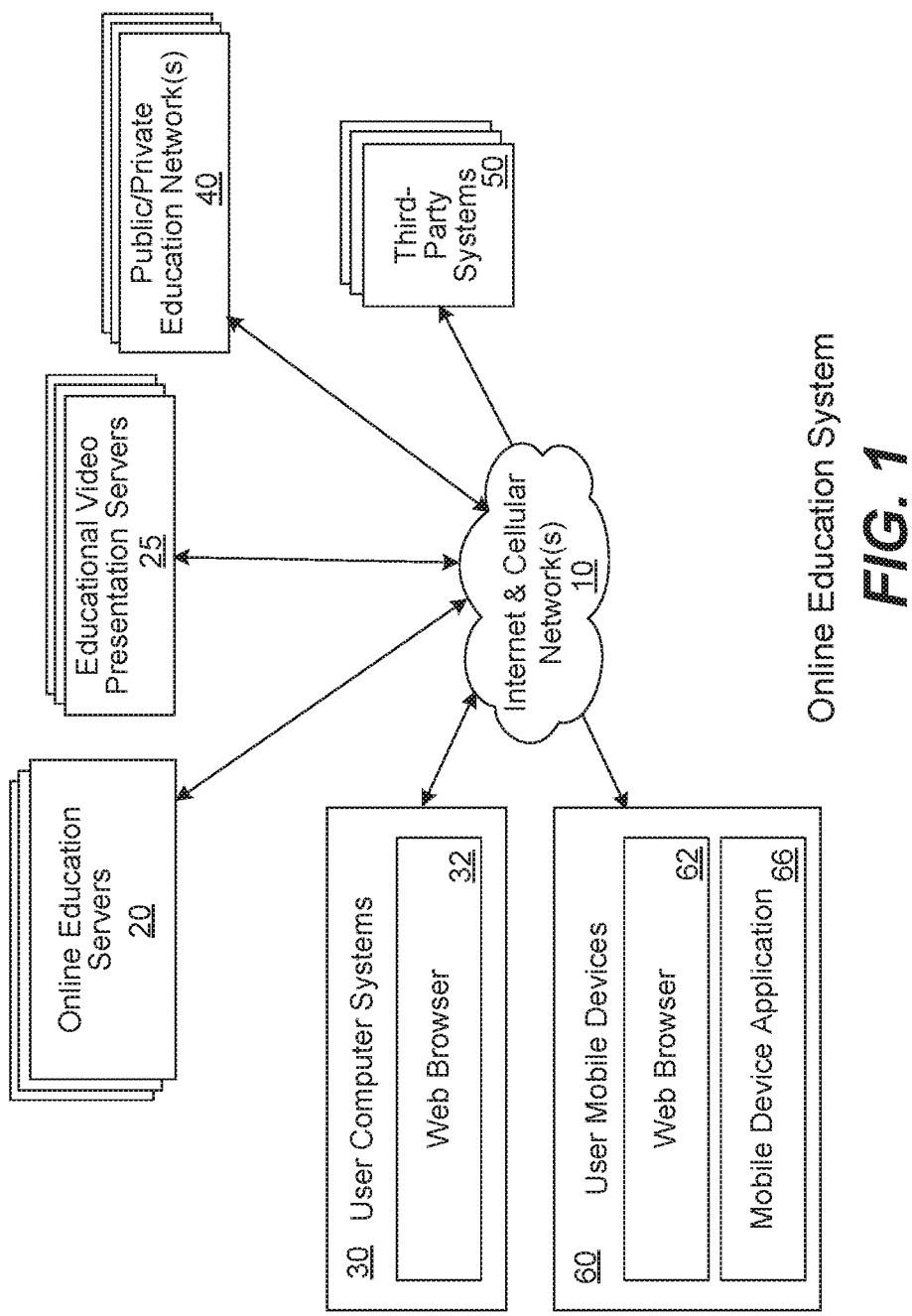
FIG. 1 is a simplified block diagram of a specific embodiment of an online education system.

Although embodiments of the invention may be used in a variety of contexts, in one specific context online education is promoted and managed by an education company via a Web site or a mobile application accessible from any computer or mobile device. A student seeking educational assistance with K-12 school or college coursework or with standardized tests (e.g., GRE, LSAT, MCAT, etc.), using resources such as videos, electronic documents, printed documents, live review sessions, one-on-one consultations with tutors, etc.) uses the Web site or mobile application to sign up or log in to a student account. Access to the relevant content is then provided via an education application hosted on a server computer.

Education Application Accessed Via a Third-Party Web Site

One technique to deter account sharing is to require each student to log in using the login credentials and system of third-party social media sites, e.g., FACEBOOK, TWITTER, INSTAGRAM, LINKEDIN, SNAPCHAT, VINE, GOOGLE PUS, etc. Because a student will typically want to keep access to their own account on the social media Web site private, the student will be less likely to share their login credentials with others. The education application purposefully does not provide an option for a user to create his or her own account within the education application (the student would likely be more willing to share any account created within the education application, as this account would not provide access to personal information beyond the education application).

Preferably, students are encouraged or required to use their actual FACEBOOK account in their own name, and not a fictitious account, because a student would face more consequences (exposure of private information, a stranger impersonating them on a social media site, use of their social media identity to post inappropriate things or to intercept personal FACEBOOK messages, sharing the social media information with others, etc.) if they were to share their actual account, and thus are significantly less likely to share their own account. Social media identities have become irrevocably linked with peoples' actual real life identities, and few would want to jeopardize their social media identities by supplying the credentials to others.

In one specific embodiment, the education company has developed an education application that is hosted within a page of the social media site FACEBOOK instead of allowing access using other login credentials. Each student is required to log in first to their FACEBOOK account using their own FACEBOOK login credentials in order to access the online education application. This technique prevents fraud as most students will have private content on FACEBOOK (such as messages and photographs connected with their identity) and will therefore be less inclined to share their FACEBOOK login credentials in order to share the resources of the online education application (such as the ability to watch videos, to download files, to spend tokens, etc.) with other students. Even if a student accesses his or her account using an application downloaded to a mobile telephone, he or she must still login to his or her FACEBOOK account in order to access the online education application.

In an alternative embodiment, a mobile application is downloaded to a smartphone (an iPhone, for example) and the education application is accessed via the student's FACEBOOK account (for example). A student first downloads the mobile application (the "app"). Next, the only login option is to sign in with their FACEBOOK credentials (e.g., "Login with FACEBOOK"). After logging in using the FACEBOOK credentials, the student may then access the online education application. In this embodiment, the student does not need to go to the education company Web site separately in order to access the education application.

Block Diagrams

FIG. 1 is a simplified block diagram of a specific embodiment of an online education system 1, which may be implemented via a computerized data network to provide the service of the education company. As described in greater detail herein, different embodiments of system 1 may be configured to provide various different types of functionalities generally relating to online education. As shown, system 1 may include one or more of the following types of computers, systems, networks, Web sites, databases, mobile devices, etc.

Online education servers 20 perform and implement various types of functions, operations, actions, and other features such as those described herein. Educational video presentation computer servers 25 include videos of educational courses, videos of tutors presenting review materials, etc., all used by students who have access to system 1. Public/private education networks 40, include, for example, student information systems, student data management systems, course management systems, etc., used by schools, colleges, and universities.

User computer systems 30 include any suitable desktop, laptop, tablet computers, etc., operable to provide the various types of online education described herein. User mobile devices 60 include any suitable mobile telephone, personal digital assistant, etc., operable to provide the various types of online education described herein. Internet and cellular networks 10 include suitable wired or wireless networks used for communication between the entities of system 1. Third-party systems 50 include computer servers, Web sites, software, etc. of social media company sites such as FACEBOOK, TWITTER, INSTAGRAM, LINKEDIN, SNAPCHAT, VINE, GOOGLE PUS, etc.

Figure 2:
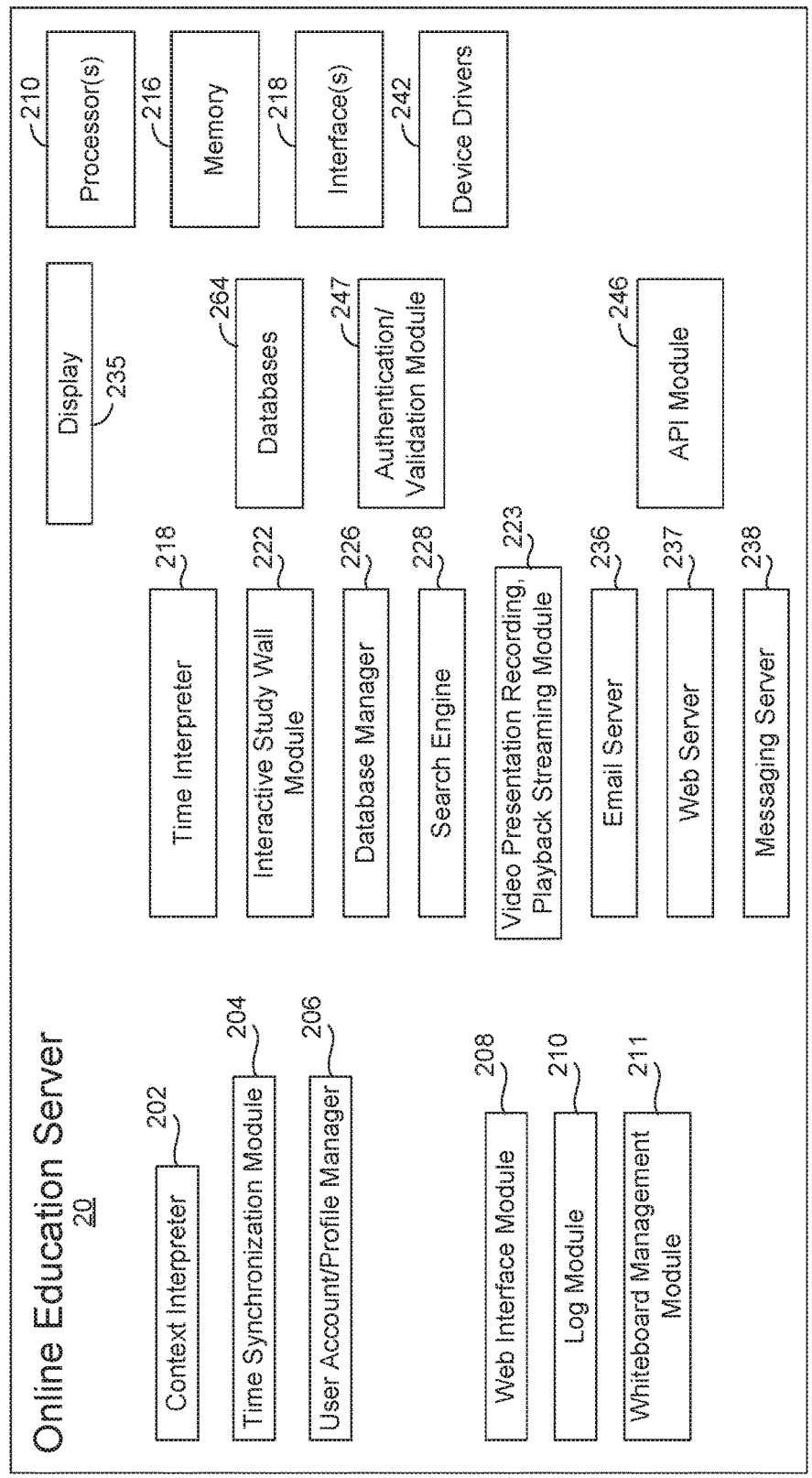
FIG. 2 is a block diagram of software modules and hardware components of an online education computer server in accordance with a specific embodiment.

FIG. 2 is a block diagram of software modules and hardware components of an online education computer server 20 in accordance with a specific embodiment. These modules and components may be implemented upon a single computer or upon multiple computers in communication with one another.

Context interpreter 202 is operable to analyze contextual criteria relating to a detected set of events and automatically determine or identify one or more contextually appropriate responses based on the contextual interpretation of the detected events. Contextual criteria include: location-based criteria; time-based criteria; identity of a user; user profile information; transaction history information; recent user activities; and proximate business-related criteria. Time synchronization module 204 is operable to manage universal time synchronization (e.g., via NTP or GPS). Search engine 228 is operable to search for transactions, logs, items, accounts, or options in the online education system databases. Time interpreter 218 is operable to modify or change identifier activation and expiration times based on various criteria such as time, location, transaction status, etc.

Authentication/validation module 247 includes user identifiers, passwords, software/hardware identifiers, SSL certificates, etc., which are operable to perform various types of authentication and validation tasks such as: verifying/authenticating devices, verifying/authenticating users, verifying passwords, passcodes, SSL certificates, biometric identification information and/or other types of security-related information, and verifying/validating activation or expiration times, etc.

Interactive study wall module 222 is operable to implement various types of wall functions such as allowing a user to post text and images to a wall, or to read postings on a wall. White board management module 211 is operable to perform various types of electronic whiteboard functions. Video presentation recording, playback, streaming module 223 is operable to facilitate, enable, initiate, and perform one or more of the operations relating to the video presentation techniques described herein. Database manager 226 is operable to handle various tasks relating to database updating, database management, database access, etc.

Log module 209 is operable to generate and manage transactions history logs, system errors, connections from APIs, etc. Web interface module 208 is operable to facilitate and manage communications and transactions with other Web portals. API module 246 is operable to facilitate and manage communications and transactions with other APIs of other systems or networks.

Processor 210 may include one or more commonly known CPUs, which are deployed in many of today's computers and consumer electronic devices. Memory 216 may include volatile memory (e.g., RAM), non-volatile memory (e.g., disk memory, FLASH memory, EPROMs, etc.), unalterable memory, and other types of memory. Interface 218 includes wired or wireless interfaces. Device drivers 242 includes functionality similar to one or more computer system driver devices generally known to one having ordinary skill in the art. One or more displays 235 may be implemented using, for example, LCD display technology, or other types of conventional display technology.

E-mail Server 236 provides various functions and operations relating to e-mail activities and communications. Web server 237 provides various functions and operations relating to Web server activities and communications. Messaging server 238 provides various functions and operations relating to text messaging or other social network messaging activities and communications.

Figure 3:
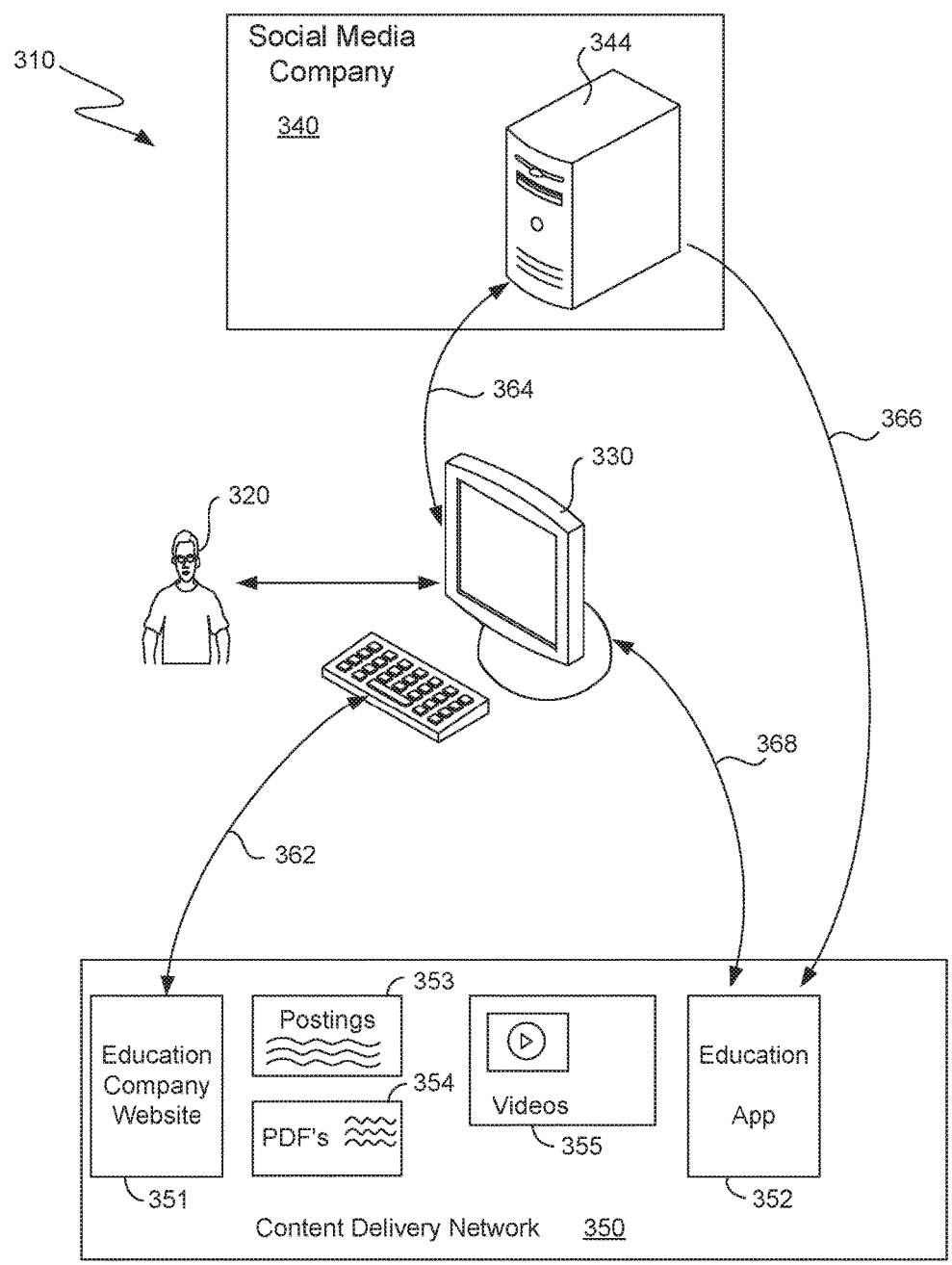
FIG. 3 is a block diagram of an authentication system according to one embodiment.

FIG. 3 is a block diagram of an authentication system according to one embodiment. Included is a user 320 interacting with a computer 330, such as any of devices 30 or 60 mentioned above. Also included is a variety of information hosted upon a content delivery network (CDN) 350. The CDN may be any of a variety of networks such as Akamai, Limelight, Amazon Web Services, etc., and the information need not be hosted upon a single one of these networks, but may be spread across different networks. Included is a Web site of the education company 351, an education application 352 (mentioned above), user postings 353 (e.g., textual comments, photographs, etc. commonly known as a "Wall"), PDF files 354 or any other type of electronic documents and files, and videos 355 such as videos from tutors or professors, videos of live classes, or other instructional videos. Education application 252 may include any or all of the modules and components of FIG. 2.

FACEBOOK 340 is one example of any of a variety of third-party social media companies that may provide authentication services for the education company in order to authenticate any of its users. Computer server 344 is one or many computers under control of the third-party social media company that provides the authentication services. Of course, server 344 may be hosted on yet another content delivery network, yet still be under control of the third-party social media company. This diagram will be discussed in more detail below with reference to the flow diagram of FIG. 4.

Flow Diagram

Figure 4:
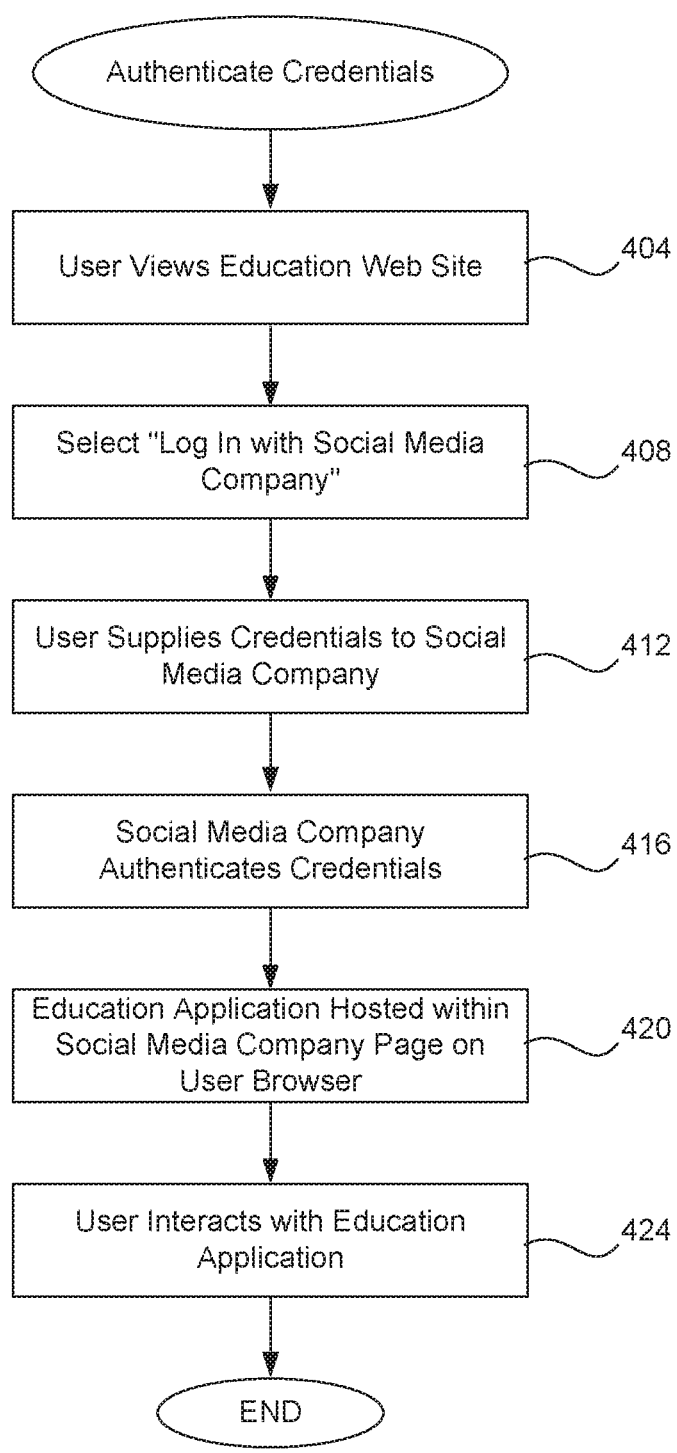
FIG. 4 is a flow diagram describing one embodiment by which a third-party social media company authenticates the credentials of a user of the education application.

FIG. 4 is a flow diagram describing one embodiment by which a third-party social media company authenticates the credentials of a user of the education application. As mentioned above, even though a user desires to use the services of the education application developed by the education company, the user is only able to access those services using his or her login credentials belonging to a particular third-party social media company.

In step 404 user 320 uses a browser on the computer 330 to view the Web site of the education company as shown at 362, but at this point has not been authenticated and does not have access to any of the services of the company, such as the user's account, the ability to watch instructional videos, contact tutors, post to or read from the Wall, use of the tutor matching service, etc. The education company Web site provides basic information such as introductory videos, information on services and pricing, lists of available courses, information on tutors, etc. Included on the Web site is a button or link allowing the user to log in to the education application using their log in credentials from one of a variety of social media companies such as FACEBOOK, TWITTER, INSTAGRAM, LINKEDIN, etc.

The below description will use an example in which the social media company is FACEBOOK, although a user may log in to the education application using their login credentials from any other social media company. Preferably, the login credentials that a user must use to log in to the education application are credentials from a social media company that requires each user to have a personal account. In other words, each personal account includes personal details about the user (such as name, address, telephone number, e-mail address, age, etc.), and allows each user to comment, to post information, to view other's information, all while being identified by name as the user of the account. In this fashion, because these social media accounts are personal to an individual and anything occurring within these accounts are attributed to the individual, it is unlikely that a user of the education application will attempt to cheat by providing their log in credentials to another student. In step 408 the user selects the log in button (in this example, "Login with FACEBOOK") from the Web site and the user's browser is then redirected to a FACEBOOK computer server, such as server 344 as shown at 364. When redirected, server 344 is provided with information (such as a link, URL, network address, etc.) allowing the server to eventually confirm authentication to the education application 352. At this point, the user is now communicating with the social media company which will provide the authentication.

In step 412 the user is presented via his browser with a standard FACEBOOK login page from server 344, requesting the user's user name and password, or similar credentials. If the user chooses not to supply his or her FACEBOOK credentials, or supplies incorrect credentials, then he or she will not be allowed access to the education application and will not be allowed to use any of the services of the education company. Assuming that the credentials are supplied, then in step 416 the FACEBOOK server 344 authenticates these credentials using information stored under control of the third-party social media company. In other words, the credentials can only be authenticated by the third-party social media company and not by the education company. The user may also be advised by FACEBOOK that continuing means that the education company will receive certain user information held by FACEBOOK such as the user's public profile and e-mail address. Next, server 344 provides, as shown at 366, certain personal user information held by FACEBOOK such as name, e-mail address, unique identifier, etc., to the education application 352.

Assuming that the provided information identifies a valid user within the education application (or identifies a new user), then the education application provides content as shown at 368 so that it becomes hosted within the FACEBOOK page as shown on the user's browser. In other words, the user's browser may display not only a portion of a FACEBOOK page from computer server 344, but also hosted within it, the content of the education application from CDN 350. Techniques such as use of frames and iFrames may be used. Of course, it is also possible that the content of the education application will appear exclusively within the user's browser and that information from the third-party social media page will not appear.

Figure 5:
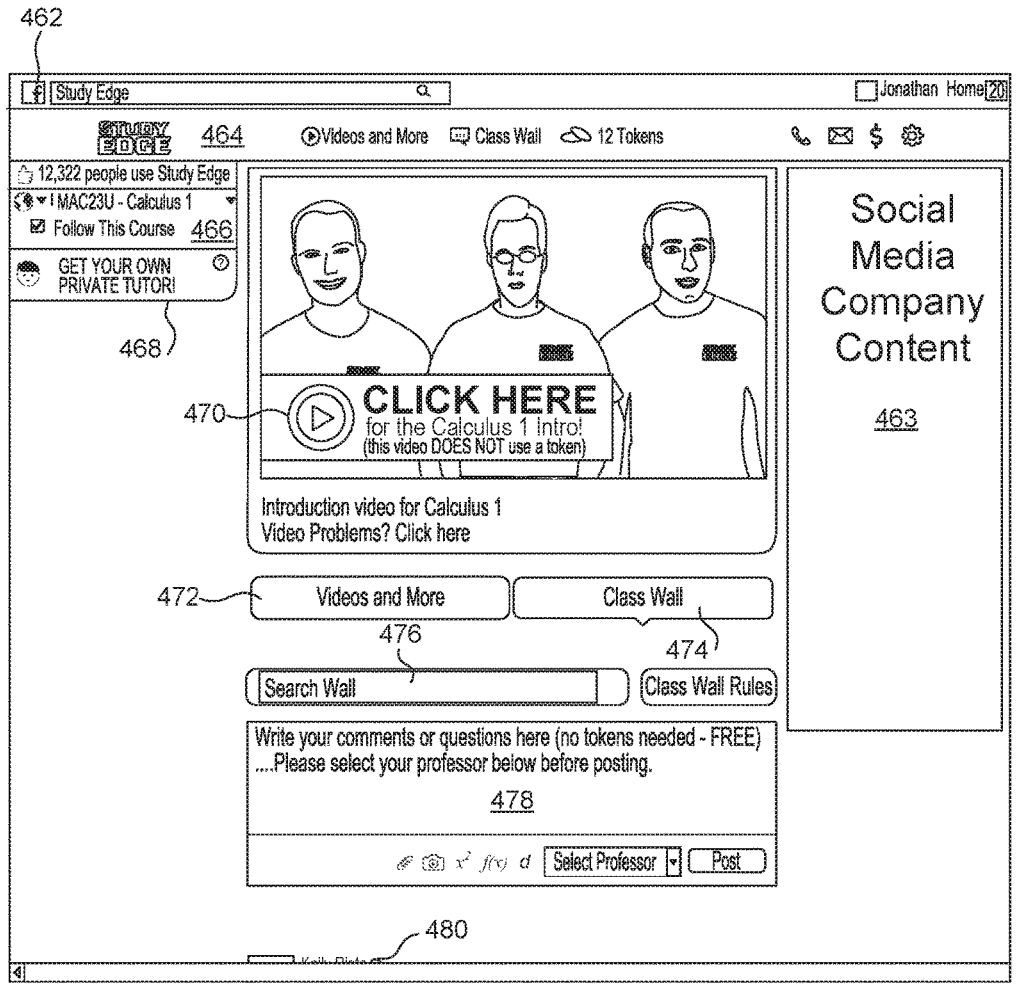
FIG. 5 is a screen shot of the user's browser showing the education application hosted within a FACEBOOK page.

FIG. 5 is a screen shot 460 of the user's browser showing the education application hosted within a FACEBOOK page (e.g., the browser's URL is "https://apps. FACEBOOK/ study edge"). For example, content 462 and 463 at the top and right edge of the browser window displays content from the FACEBOOK page hosted on server 344, while content 464-480 is content from the education application 352. Bar 462 allows a user to return to the FACEBOOK site, to conduct research within FACEBOOK, to view their FACEBOOK account, etc. Content 463 provides links to chat, to play games etc., within FACEBOOK. Using buttons and links within bar 464, the user is able to select videos, select the Wall, view their tokens, contact the education company, recharge their tokens, adjust settings, etc. Drop down menu 466 allows the user to select a different course, while link 468 allows the user to take advantage of the tutor matching service. Button 470 allows the user to begin watching an introductory video for a particular course, or button 472 allows access to even more instructional videos. Buttons and input regions 474-478 allow the user to post information to, or read information from, the class Wall. Region 480 (and below, not shown) shows actual contents of the Wall, allowing users to ask questions, provide answers, and interact with a tutor for the currently selected course shown at 466.

Accordingly, now that the user has been authenticated by the third-party social media site, using the user's credentials of that site, the user may now interact 424 with the education application 352 provided by the education company.

In a modification of this embodiment, the user may first log into the Web site of the social media company, be authenticated by that social media company (e.g., FACEBOOK), and then search for the name of the education company (e.g., "Study Edge") within the FACEBOOK applications. Once found, the education application is selected, FACEBOOK passes the user's information to the education application, and the user's browser is redirected to the education application 352 in order to display the education application hosted within the FACEBOOK page as described above in step 420. The user may then interact 424 with the education application as described above.

Mobile Embodiment

Similar to the above embodiment of FIG. 3 in which a user uses a browser on their computer to access the education application, a user may also use a browser on a mobile telephone (or other mobile device) in order to first access the education company Web site and then to be authenticated by the third-party social media site as described in the flow diagram of FIG. 4. The user would then have access to the education application in a browser on their mobile telephone as described above without the need for a special application on their mobile device.

In a more common embodiment on a mobile telephone, a user first downloads a mobile application from the education company to the mobile telephone in order to access the education application on the content delivery network. This mobile embodiment will now be described with reference to previous FIGS. 3 and 4. Instead of interacting with a computer 330, user 320 interacts with his or her mobile telephone (or similar mobile device) that is capable of downloading and executing a mobile application or "app." The user downloads and installs this application from a repository of mobile applications such as the "App Store" for Apple telephones, "Google Play" for telephones that use the Android operating system, by searching for the mobile application within a social media Web site (such as within FACEBOOK), or from a similar source.

The user selects this mobile application on their telephone and is then prompted to log in with their FACEBOOK credentials (using that social media Web site as an example) as described in step 408. At this point, the telephone is communicating with a FACEBOOK computer server which is requesting the user's credentials. Next, the user supplies his or her FACEBOOK login credentials to the FACEBOOK server by entering information on the mobile telephone (as shown at 364) and FACEBOOK then authenticates those credentials as described in steps 412 and 416.

Next, assuming that the user is authenticated, the FACEBOOK server passes back the user identifying information which it controls (name, e-mail address, unique identifier, etc.) to the mobile application on the telephone (instead of passing the information via 366 as described in the above embodiment). The mobile application, in turn, then passes this same information to the education application 352 within the content delivery network. Next, the mobile application retrieves content from the education application and displays that content on the mobile telephone so that the user may interact and use the services of the education application, such as shown at 368.

In this embodiment the education application executes exclusively on a mobile telephone and is not hosted within FACEBOOK page as described above. Thus, although content 464-480 of FIG. 5 will appear on the user's telephone, this content may appear in a different form and will not include any of the FACEBOOK content 462 or 463. Accordingly, the user may then interact with the education application using the mobile application on their telephone after being authenticated by a third-party social media site.

Requirement for Friends, Contacts or Links

Another technique has a requirement for a certain number of "friends" in FACEBOOK, a certain number of links, recommendations, or associates in LinkedIn, a certain number of "friends" or "tweets" in Twitter, or a certain number of contacts in other social media sites before a student may use the resources of his or her account. Other threshold requirements may include the number of posts on a given social media site (e.g., FACEBOOK, TWITTER, INSTAGRAM, LINKEDIN, etc.), the number of friends or contacts on the site, the "age" of the account (a minimum of how long someone has been a member of a given media site or the amount of time since the account was started), or any combination of the above. This technique is useful to prevent a student or students from setting up a fictitious FACEBOOK account (or an account on a similar Web site) and then sharing that single account amongst any number of students.

Using FACEBOOK as an example, any student may be allowed to access the education application via his or her FACEBOOK login credentials (using a desktop computer, a downloaded application on his or her mobile device, etc.), and may even be allowed to purchase a monthly plan. In order to access any of the content within the education application (such as watch a video, download or view electronic documents, study notes, post a question, etc.) the student is told that he or she must meet a minimum requirement of 50 friends (or any other minimum number). When a student does not meet the minimum requirement, the student is warned that he or she must have at least 50 (or some other minimum number) FACEBOOK "friends" before attempting to access any of the content within the education application. This warning may come in the form of a pop-up window, an error message, etc., that is displayed when the student attempts to access content. The warning may also be presented when the student first sets up an account, purchases a monthly plan, views the terms and conditions, etc. This warning may also be sent to the e-mail address associated with the student's social media profile, sent as a FACEBOOK message to the FACEBOOK account, or sent via text message to the number on record.

In reality, though, the education application requires a higher minimum number than what is publicly stated to the student, e.g., in reality, a student is actually required to have 100 FACEBOOK "friends," rather than 50, for a student to access content. The higher minimum number can be any number, as long as it is greater than the stated minimum number. The minimum number (such as 50) displayed to the student, however, is fictitious.

The reason for this two-tier requirement is as follows: more than likely, any student with a legitimate FACEBOOK account will have more than the actual minimum number of FACEBOOK friends (e.g., 100 FACEBOOK "friends"). If a student attempts to access content, but does not have at least 50 FACEBOOK friends, then the error message displays "You must have at least 50 FACEBOOK friends to view content." Any account with less than 50 FACEBOOK friends is likely to be a fictitious account. A fictitious account will usually have no friends or very few friends. In this situation, it is possible that an unscrupulous student or students will add friends to the fictitious account such that the account then has at least 50 friends.

When a student next tries to use the fictitious account that has between 50 and 99 friends (likely a fictitious account will have close to 50 friends) a special error message (e.g., "Error #1") comes up asking the student to call a particular telephone number, send an e-mail or text message to a particular address, personally come into the office, or contact the education company in some other manner. But, no explanation is given for the error message and preferably a student is never informed of the actual minimum number of, for example, 100 friends. Typically, a student trying to use a fictitious account will not contact the education company because he or she believes they have been caught trying to access the program with a false account, the account is then frozen, and no student is able to use the fictitious account to access content of the education application. But, if a student does call inquiring about the "Error 1" message, they are asked to provide photographic identification (or some other form of personal identification). The name on photographic identification must match the name on the FACEBOOK account, as well as the image of the person with the identification. For instance, a student may be asked to join a videoconferencing portal whereby the student can be seen and compared with the provided form of application. If the student does not contact the education company or if the student is unable to provide proof that the account correctly belongs to them, then the account is likely fictitious (or the student is not using their own account); again, the account remains frozen.

If the student can prove that the FACEBOOK account is actually their own, then an exception is put into the system for that student and the student is allowed to use the account to access content even though they have fewer than 100 FACEBOOK friends. This account is now flagged in the system as an exception account and an automatically generated report looks for irregularities in these accounts periodically. In some circumstances, a student from a foreign country, a student new to the university, or a student who typically has not used or does not use FACEBOOK will have fewer than 100 FACEBOOK friends and will need to go through this verification process, even though they are using their own legitimate account.

A search may also be performed in an attempt to find the actual FACEBOOK account of the student to determine if the profile that they are attempting to use is a secondary profile rather than their primary profile. For instance, a student may contact the education company and say that his name is, for instance, Gareth Lee Jones and attends the University of Florida, and his FACEBOOK account is ascribed to someone named G Jones. The FACEBOOK account only has 52 friends. He is able to provide photo identification or other proof that G Jones on FACEBOOK is himself. The education company, however, will also perform a search for a Gareth Lee Jones who attends the University of Florida, and may find another account for Gareth Lee Jones, who attends the University of Florida, and who looks exactly like the Gareth Lee Jones claiming to have the G Jones account. This other account actually has 560 friends. This means that Gareth has created a secondary account, separate from his real FACEBOOK account, for the sole purpose of using the education application. Gareth is likely going to share this fake, secondary FACEBOOK account with others, since there is no actual personal information on this secondary account that he would not want to share. The education company may ask other questions, like a student's major, high school, etc., for the purposes of this validation process. If an alternate or secondary profile is found, the education company informs the student that they must use their primary profile to access the educational application.

Student accounts that do have at least 100 FACEBOOK friends may automatically be authorized to access content of the education application. Student accounts having between 50 and 99 FACEBOOK friends will typically automatically receive the "Error 1" message as it is possible that these are fictitious account. Of course, the fake minimum of 50 friends and the actual minimum of 100 friends are thresholds that may be adjusted to be any particular number depending upon the third-party Web site that is hosting the education application, the type of friends, links or contacts that are subject to the minimum, the type of access desired, the type of monthly plan, business model, etc. The minimum is determined by the education company and can be adjusted within the administrative system of the education company. The fake minimum is always lower than the actual minimum, as this is a way to discourage scammers from contacting the education company and proceeding with the scam.

Flow Diagrams

Figure 6:
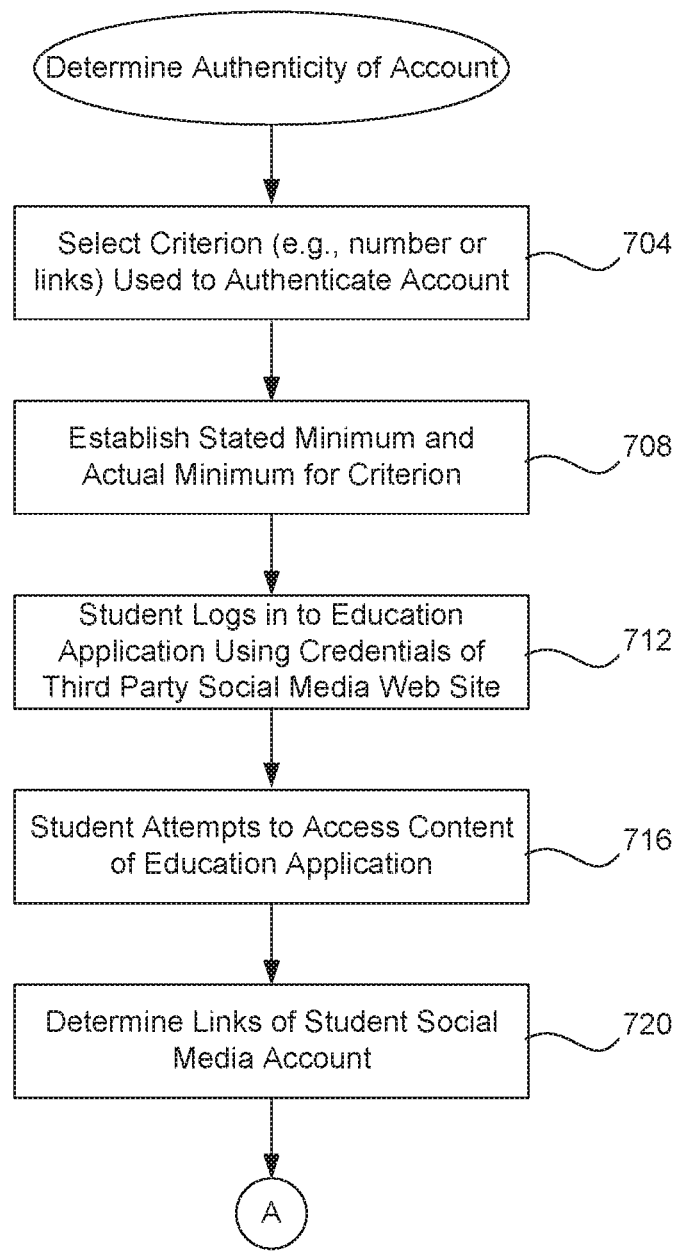
FIGS. 6 and 7 are a flow diagram describing one embodiment by which the authenticity of a social media account is determined.
Figure 7:
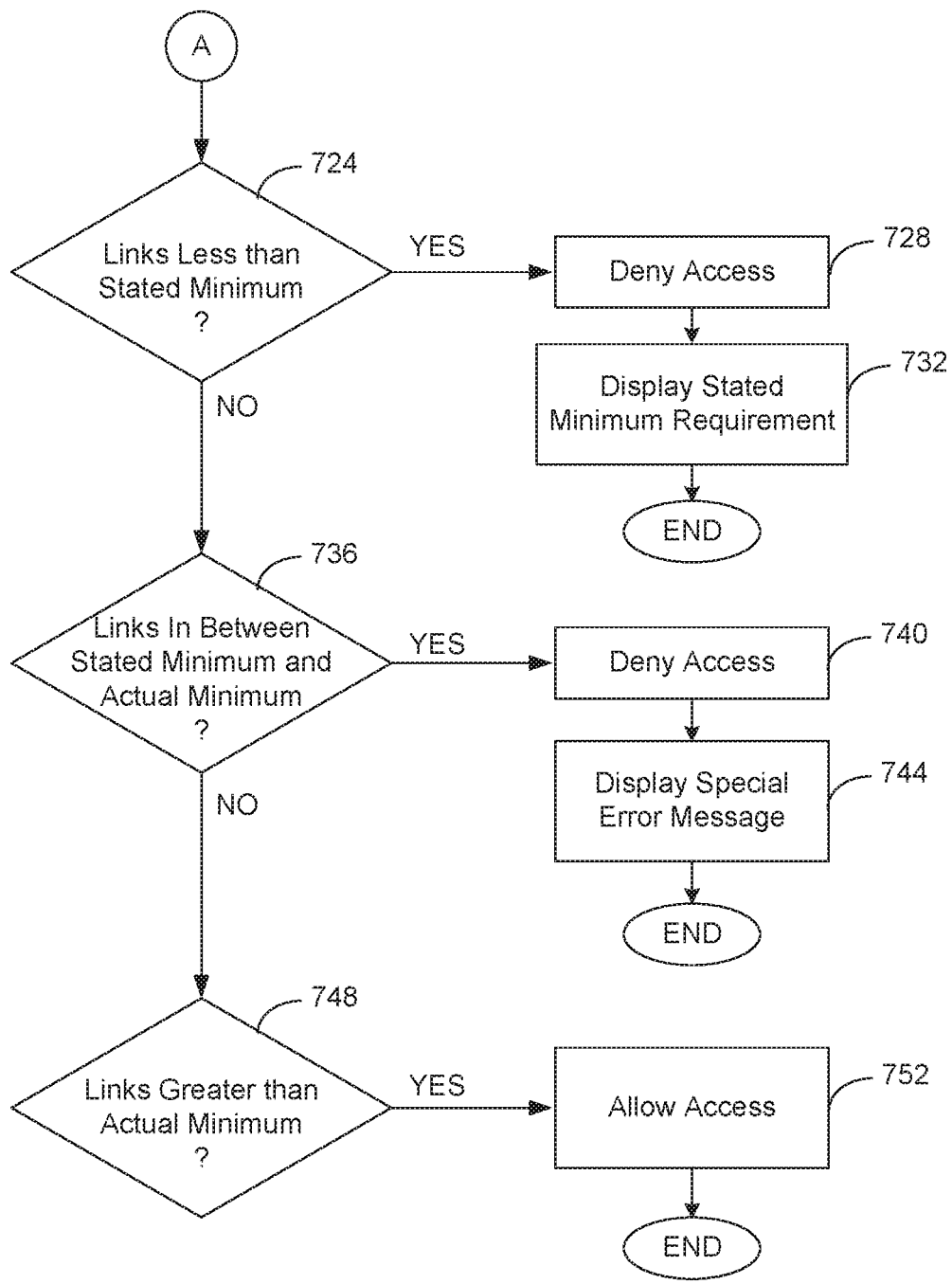

FIGS. 6 and 7 are a flow diagram describing one embodiment by which the authenticity of a social media account is determined. As mentioned above, if the account is deemed authentic then the student may access the resources of the education application, if not, then access is denied. The below steps may be implemented by the user account manager 206 and by other modules and hardware components mentioned below and shown in FIG. 2.

Initially, two steps 704 and 708 are performed before a student logs into the education application. Preferably, the steps are performed before any student logs in, although it is possible to change the selected criterion and the minimums before each student logs in. In practice, it is anticipated that the criterion and minimums will be chosen before the education application is deployed, although they may be changed from time to time as conditions change.

In step 704 a criterion is selected from the third-party social media Web site that is used to host the education application. A criterion is selected that indicates that the user account on the social media site is likely an actual account of a student and is not a temporary, fake, or other account established simply to allow students to share the account. One criterion may be the number of links from the user account to other people, such as the "friends" link on the FACEBOOK social media site, the "connections" or "contacts" link on the LINKEDIN site, the number of "followers" on the TWITTER site, or a similar link of a user account to other people on the INSTAGRAM or similar social media sites. Another criterion may be the number of discrete messages published on the social media site from the user account, such as the number of posts from a FACEBOOK account, the number of updates or posts from a LINKEDIN account, the number of "tweets" from a TWITTER account, or similar content published on other social media sites. Yet another criterion may be the age of a particular user account, i.e., how long it has been since the account was established. Other criteria may include the number of photographs, groups, or posts that are "liked," the number of status updates, the number of logins over a period of time, the number of activities, the number of interactions with other applications, etc.

In step 708 a stated minimum and an actual minimum for the selected criterion are established. For example, if the criterion is number of FACEBOOK "friends," then the stated minimum may be 60 friends while the actual minimum may be 80 friends. Or, if the criterion is number of "tweets" from a TWITTER account, then the stated minimum may be 400, while the actual minimum may be 800. Or, if the criterion is the age of the account, then the stated minimum may be two weeks, while the actual minimum may be two months. As mentioned, the stated minimum may be published within the education application or may be revealed to a user who is attempting to access content, but the actual minimum is kept secret by the education application. Once these two steps have been completed, then students may attempt to login and use the education application.

At some later point in time, in step 712, a student will log into the education application using the credentials of the third-party social media Web site within which the education application is hosted as has been described above. Assuming log in is a success, the student may be presented with a Web page as shown in FIG. 5 as has been described above. The students made an attempt to use the resources of the education application such as by accessing the tutor matching service 468, watching a video via button 472, performing a search on the wall 476, posting to the wall 478, opening a chat window, downloading study guide documents, etc. As use of these resources requires a valid and authentic account, it will be determined whether or not the account is authentic. Alternatively, as soon as user log in is successful, the determination may begin and the user may not be presented with the option to use any resources.

In step 720 the module determines the quantity of the selected criterion within the context of the social media site used to host the education application. For example, if the education application is hosted within FACEBOOK, the student has logged in using his or her FACEBOOK credentials, and the selected criterion is "number of FACEBOOK 'friends'," then the step determines how many "friends" this FACEBOOK account has. This determination may make use of API module 246 in order to invoke an API of the corresponding social media site in order to determine the number of the selected criterion.

In other embodiments, this step may determine how many contacts a user account has, how many posts or similar messages have been published in a particular user account, or how old the user account is using similar techniques.

Next, in step 724 it is determined whether the number of links (or other criterion) is less than the stated minimum. If so, then in step 728 the student is denied access to use any of the resources of the education application, or may be denied access to the education application altogether. Alternatively, the student may be allowed to use any of the resources that do not require a token (i.e., resources that are free). Once denied access, then a message in step 732 is displayed to the user indicating that access is denied and what the stated minimum requirement for the criterion is.

Figure 8:
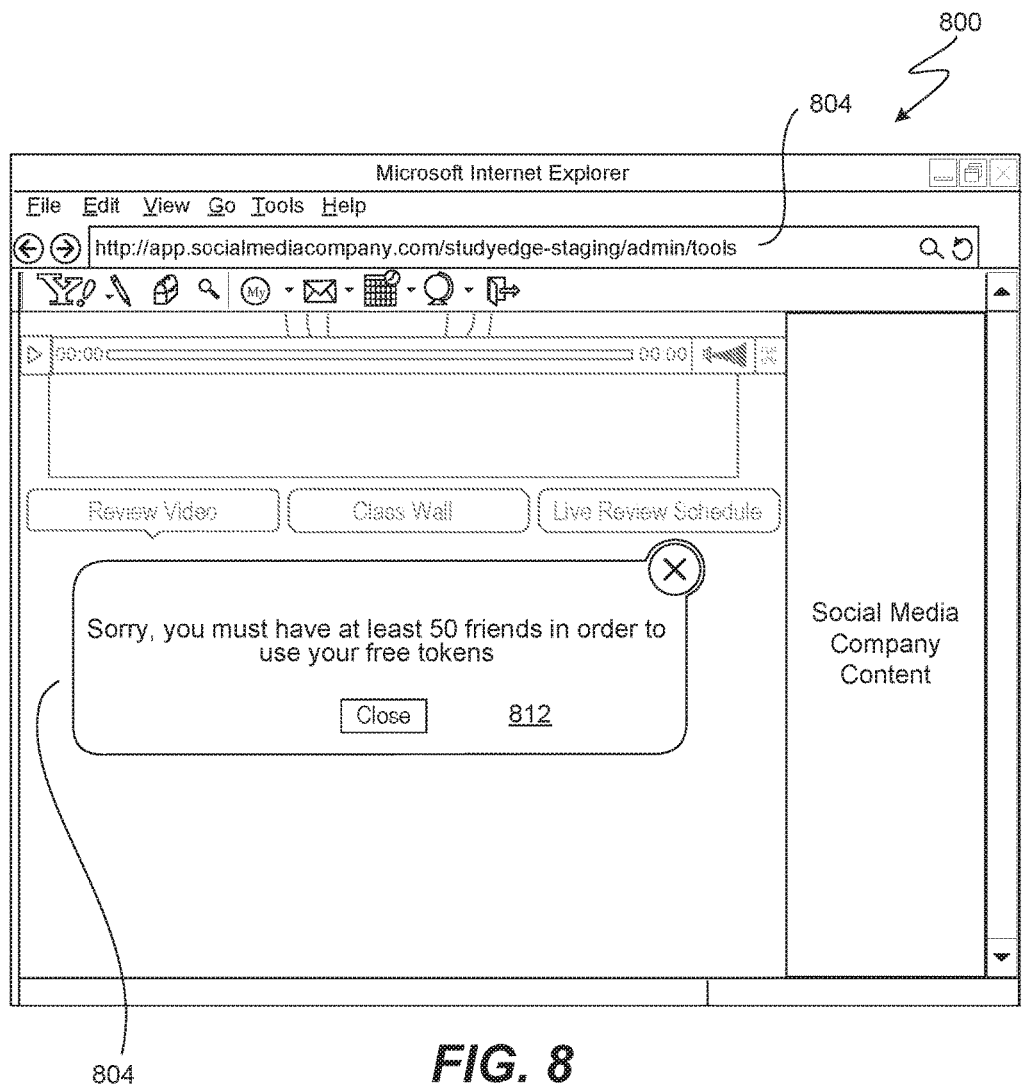
FIG. 8 illustrates a Web page displayed on a user's computing device that denies access.

FIG. 8 illustrates 800 a Web page displayed on a user's computing device that denies access. Shown is a Web page 808 indicating resources available within the education application (similar to or the same as the Web page shown in FIG. 5), a URL 804 indicating that the education application is hosted within FACEBOOK, and a pop-up window 812 indicating that access is denied and that the stated minimum number of friends required is 50. Once the user has viewed this message and closed the window then the resources of the education application will not be available to the user.

If in step 724 the number of links is not less than the stated minimum, then step 736 checks whether the number of links is greater than the stated minimum but below the actual minimum. If so, this indicates possible fraud in that a user may have opened a fake account and may have increased the number of links, friends, posts, etc. (according to the selected criterion) just enough to be over the stated minimum. If so, then again access is denied in step 740 and a special error message is displayed on the user's computing device.

Figures 9, 10:
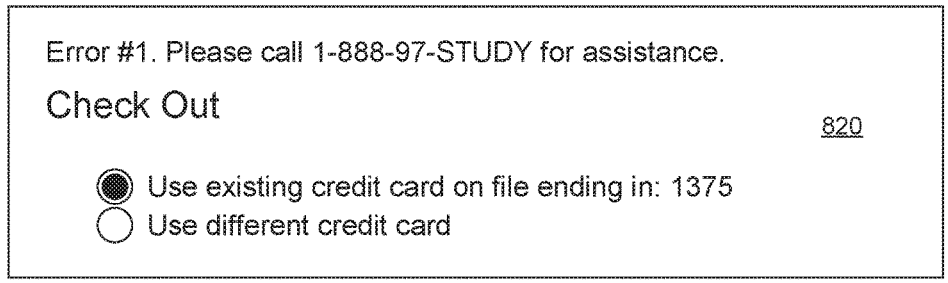
FIG. 9 illustrates a window that may pop up on the user's computing device, similar to pop-up window 812.
FIG. 10 illustrates a view of a database that indicates a membership exception list.

FIG. 9 illustrates a window 820 that may pop up on the user's computing device, similar to pop-up window 812. Note that this special error message does not indicate what the actual minimum of the selected criterion may be. It only provides a way to contact the education company along with a particular error number. Once the user has viewed this message and closed the window then the resources of the education application will not be available to the user.

If in step 736 the number of links is not between the two minimums, but is greater than the actual minimum, then control moves to step 748. If the number of links is greater than the actual minimum, then in step 752 the user is allowed access to the education application and is allowed to use its resources.

As mentioned earlier, a user who has opened a fake account receives error message 820 is unlikely to contact the education company in an attempt to access the resources of the education application. But, a legitimate user who does have an authentic account may contact the education company and provide an explanation, documents, photograph, identification, etc., in order to establish that his or her user account is actually an authentic account even though it does not have the required number of links that is greater than the actual minimum. If so, the education company may grant an exception to this user and modify a suitable database.

FIG. 10 illustrates a view of a database 830 (stored within one of databases 264) that indicates a membership exception list. This database includes a record for each individual in the list, showing their name 832, whether or not they do have a valid membership 836 and the number of links (or a similar criterion) 834 for their social media user account. In the course of determining whether or not a particular user account has the required number of links, user account manager 206 will consult this membership exception list and will bypass steps 720-748 and will automatically allow access 752 for any students in this list.

Protection of PDF Files

Another technique used to prevent sharing of resources is in the naming conventions of the PDF files. Electronic documents are opened automatically in a browser window in order to decrease the likelihood that a student will save these documents to their own computer. Furthermore, even when a student does save an electronic document to their own computer, the document is automatically saved with a random string of characters for a file name. The random string of characters appears to be gibberish. For example, a PDF file that appears within the education application as having a file name of "Session 12 Review Guide.pdf," may be given a file name of "88vj339gfh.pdf" if the user saves this file to their computer. Use of such a random file name is purposeful. A student is unlikely to need to re-access the PDF file in the future, unless he or she is looking to find the files to send to another user. A random, nonsensical file name makes it much more difficult for the student to search for and retrieve the file in their computer system.

Computer System Embodiment

Figure 11:
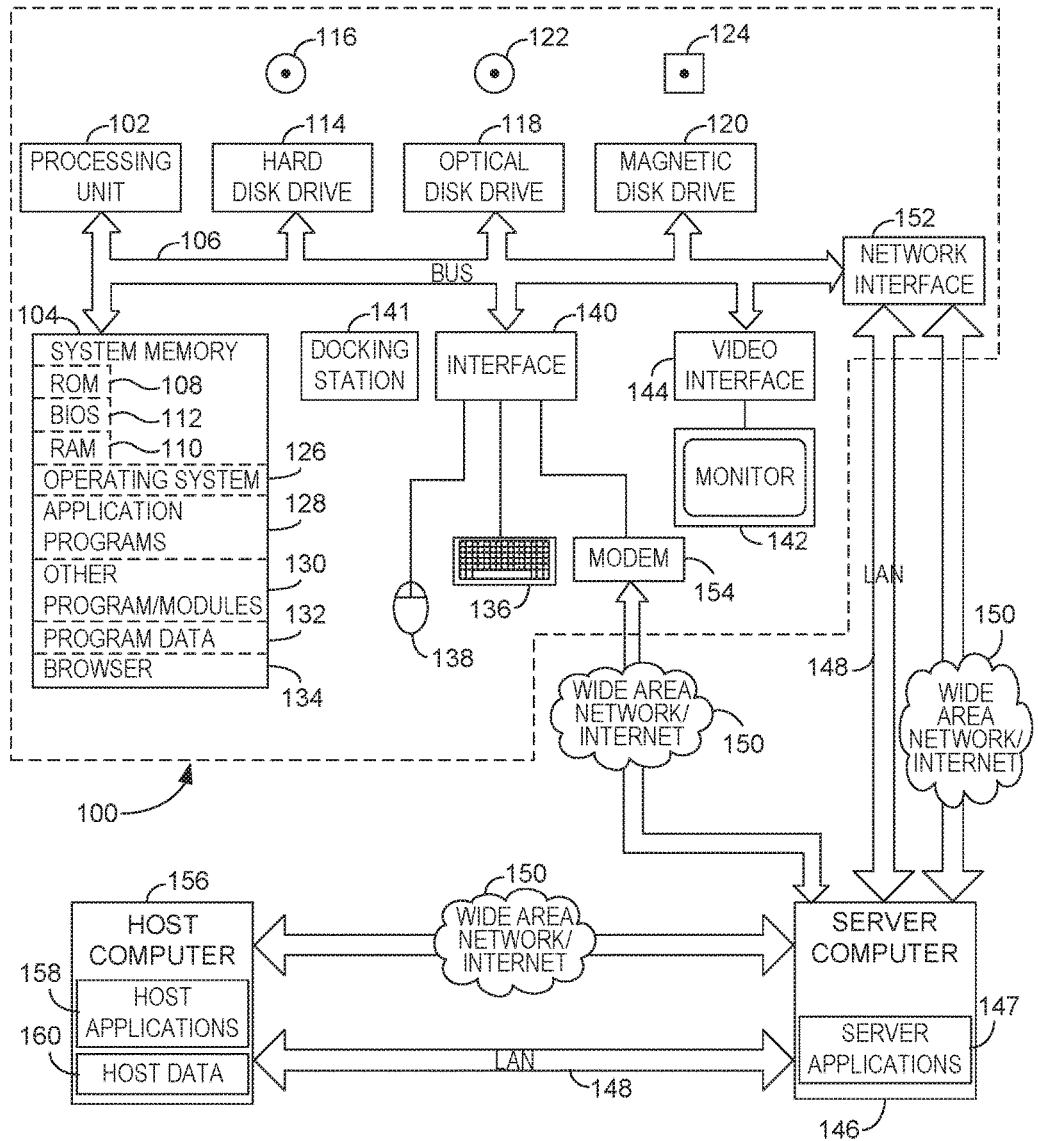
FIG. 11 illustrates a computer system suitable for implementing embodiments of the present invention.

FIG. 11 in cooperation with the above provides a general description of a computing environment that may be used to implement various aspects of the present invention. For purposes of brevity and clarity, embodiments of the invention may be described in the general context of computer-executable instructions, such as program application modules, objects, applications, models, or macros being executed by a computer, which may include but is not limited to personal computer systems, hand-held devices, multiprocessor systems, microprocessor-based or programmable consumer electronics, network PCs, mini computers, mainframe computers, and other equivalent computing and processing sub-systems and systems. Aspects of the invention may be practiced in distributed computing environments where tasks or modules are performed by remote processing devices linked through a communications network. Various program modules, data stores, repositories, models, federators, objects, and their equivalents may be located in both local and remote memory storage devices.

By way of example, a conventional personal computer, referred to herein as a computer 100, includes a processing unit 102, a system memory 104, and a system bus 106 that couples various system components including the system memory to the processing unit. The computer 100 will at times be referred to in the singular herein, but this is not intended to limit the application of the invention to a single computer since, in typical embodiments, there will be more than one computer or other device involved. The processing unit 102 may be any logic processing unit, such as one or more central processing units (CPUs), digital signal processors (DSPs), application-specific integrated circuits (ASICs), etc.

The system bus 106 can employ any known bus structures or architectures, including a memory bus with memory controller, a peripheral bus, and a local bus. The system memory 104 includes read-only memory ("ROM") 108 and random access memory ("RAM") 110. A basic input/output system ("BIOS") 112, which can form part of the ROM 108, contains basic routines that help transfer information between elements within the computer 100, such as during start-up.

The computer 100 also includes a hard disk drive 114 for reading from and writing to a hard disk 116, and an optical disk drive 118 and a magnetic disk drive 120 for reading from and writing to removable optical disks 122 and magnetic disks 124, respectively. The optical disk 122 can be a CD-ROM, while the magnetic disk 124 can be a magnetic floppy disk or diskette. The hard disk drive 114, optical disk drive 118, and magnetic disk drive 120 communicate with the processing unit 102 via the bus 106. The hard disk drive 114, optical disk drive 118, and magnetic disk drive 120 may include interfaces or controllers (not shown) coupled between such drives and the bus 106, as is known by those skilled in the relevant art. The drives 114, 118, 120, and their associated computer-readable media, provide nonvolatile storage of computer readable instructions, data structures, program modules, and other data for the computer 100. Although the depicted computer 100 employs hard disk 116, optical disk 122, and magnetic disk 124, those skilled in the relevant art will appreciate that other types of computer-readable media that can store data accessible by a computer may be employed, such as magnetic cassettes, flash memory cards, digital video disks ("DVD"), Bernoulli cartridges, RAMs, ROMs, smart cards, etc.

Program modules can be stored in the system memory 104, such as an operating system 126, one or more application programs 128, other programs or modules 130 and program data 132. The application programs 128, program or modules 130, and program data 132 may include information, instructions and parameters for creating, manipulating, scoring, ranking, uploading, and processing information to determine a best-fit match between students and tutors, to determine a certification of a tutor, provide filtering by a course code, etc. The system memory 104 may also include a browser 134 for permitting the computer 100 to access and exchange data with sources such as Web sites of the Internet, corporate intranets, or other networks as described above, as well as other server applications on server computers such as those further discussed above. In one embodiment, the browser 134 may be used to access course materials, view a tutor profile, and share information (e.g., questions or comments) with a tutor or otherwise build-up databases of information that may be customized for a variety of purposes in a learning environment. The browser 134 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. Although the depicted embodiment shows the computer 100 as a personal computer, in other embodiments, the computer is some other computer-related device such as a tablet, a television, a personal data assistant (PDA), a mobile telephone (or other mobile device).

The operating system 126 may be stored in the system memory 104, as shown, while application programs 128, other programs/modules 130, program data 132, and browser 134 can be stored on the hard disk 116 of the hard disk drive 114, the optical disk 122 of the optical disk drive 118, and/or the magnetic disk 124 of the magnetic disk drive 120. A user can enter commands and information into the computer 100 through input devices such as a keyboard 136 and a pointing device such as a mouse 138. Other input devices can include a microphone, joystick, game pad, scanner, etc. These and other input devices are connected to the processing unit 102 through an interface 140 such as a serial port interface that couples to the bus 106, although other interfaces such as a parallel port, a game port, a wireless interface, or a universal serial bus ("USB") can be used. Another interface device that may be coupled to the bus 106 is a docking station 141 configured to receive and electronically engage a digital pen or stylus for the purpose of data transmission, charging, etc. A monitor 142 or other display device is coupled to the bus 106 via a video interface 144, such as a video adapter. The computer 100 can include other output devices, such as speakers, printers, etc.

The computer 100 can operate in a networked environment using logical connections to one or more remote computers, such as a server computer 146. The server computer 146 can be another personal computer, a server, another type of computer, or a collection of more than one computer communicatively linked together and typically includes many or all the elements described above for the computer 100. The server computer 146 is logically connected to one or more of the computers 100 under any known method of permitting computers to communicate, such as through a local area network ("LAN") 148, or a wide area network ("WAN") or the Internet 150. Such networking environments are well known in wired and wireless enterprise-wide computer networks, intranets, extranets, and the Internet. Other embodiments include other types of communication networks, including telecommunications networks, cellular networks, paging networks, and other mobile networks. The server computer 146 may be configured to run server applications 147.

When used in a LAN networking environment, the computer 100 is connected to the LAN 148 through an adapter or network interface 152 (communicatively linked to the bus 106). When used in a WAN networking environment, the computer 100 often includes a modem 154 or other device, such as the network interface 152, for establishing communications over the WAN/Internet 150. The modem 154 may be communicatively linked between the interface 140 and the WAN/Internet 150. In a networked environment, program modules, application programs, or data, or portions thereof, can be stored in the server computer 146. In the depicted embodiment, the computer 100 is communicatively linked to the server computer 146 through the LAN 148 or the WAN/Internet 150 with TCP/IP middle layer network protocols; however, other similar network protocol layers are used in other embodiments. Those skilled in the relevant art will readily recognize that the network connections are only some examples of establishing communication links between computers, and other links may be used, including wireless links.

The server computer 146 is further communicatively linked to a legacy host data system 156 typically through the LAN 148 or the WAN/Internet 150 or other networking configuration such as a direct asynchronous connection (not shown). Other embodiments may support the server computer 146 and the legacy host data system 156 on one computer system by operating all server applications and legacy host data system on the one computer system. The legacy host data system 156 may take the form of a mainframe computer. The legacy host data system 156 is configured to run host applications 158, such as in system memory, and store host data 160 such as business related data.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method of denying access to resources of an education application, said method comprising:
    allowing a user to log in to an education application of a server computer via a computing device using credentials of a user account of a social media Web site;
    accessing said user account to quantify a number of social media links from said user account to other user accounts of said social media Web site;
    denying access to said resources of said education application by said computing device of said user when said quantity of said number of social media links is less than an actual minimum, said actual minimum not being revealed to said user and being greater than a stated minimum of social media links; and
    displaying on said computing device of said user said stated minimum when said quantity is less than said stated minimum.

2. The method as recited in claim 1 wherein said education application is hosted within said social media Web site.

3. The method as recited in claim 1 wherein said resources include the ability of said user to view a video, electronic document, or a message board on said computing device.

4. A method of denying access to resources of an education application, said method comprising:
    allowing a user to log in to an education application of a server computer via a computing device using credentials of a user account of a social media Web site;
    displaying on said computing device of said user a stated minimum of social media links;
    accessing said user account to quantify a number of social media links from said user account to other user accounts of said social media Web site;
    denying access to said resources of said education application by said computing device of said user when said quantity of said number of social media links is less than an actual minimum, said actual minimum not being revealed to said user and being greater than said stated minimum; and displaying on said computing device of said user an error message when said quantity is less than said actual minimum but greater than or equal to said stated minimum.

5. The method as recited in claim 4 wherein said education application is hosted within said social media Web site.

6. The method as recited in claim 4 wherein said resources include the ability of said user to view a video, electronic document, or a message board on said computing device.

7. A method of denying access to resources of an education application, said method comprising:

allowing a user to log in to an education application of a server computer via a computing device using credentials of a user account of a social media Web site;

accessing said user account to quantify a number of messages published on said user account;

denying access to said resources of said education application by said computing device of said user when said quantity of said number of messages published on said user account is less than an actual minimum, said actual minimum not being revealed to said user and being greater than a stated minimum of messages published; and displaying on said computing device of said user said stated minimum when said quantity is less than said stated minimum.

8. The method as recited in claim 7 wherein said education application is hosted within said social media Web site.

9. The method as recited in claim 7 wherein said resources include the ability of said user to view a video, electronic document, or a message board on said computing device.

10. A method of denying access to resources of an education application, said method comprising:

allowing a user to log in to an education application of a server computer via a computing device using credentials of a user account of a social media Web site;

accessing said user account to quantify an age of said user account, said age indicating how long since said user account was established;

denying access to said resources of said education application by said computing device of said user when said quantity of said age of said user account is less than an actual minimum, said actual minimum not being revealed to said user and being greater than a stated minimum of said age of said user account; and displaying on said computing device of said user said stated minimum when said quantity is less than said stated minimum.

11. The method as recited in claim 10 wherein said education application is hosted within said social media Web site.

12. The method as recited in claim 10 wherein said resources include the ability of said user to view a video, electronic document, or a message board on said computing device.

13. A method of denying access to resources of an education application, said method comprising:

allowing a user to log in to an education application of a server computer via a computing device using credentials of a user account of a social media Web site;

displaying on said computing device of said user a stated minimum of messages published;

accessing said user account to quantify a number of messages published on said user account;

denying access to said resources of said education application by said user when said quantity of said number of messages published is less than an actual minimum, said actual minimum not being revealed to said user and being greater than said stated minimum; and displaying on a computing device of said user an error message when said quantity is less than said actual minimum but greater than or equal to said stated minimum.

14. The method as recited in claim 13 wherein said education application is hosted within said social media Web site.

15. The method as recited in claim 13 wherein said resources include the ability of said user to view a video, electronic document, or a message board on said computing device.

16. A method of denying access to resources of an education application, said method comprising:

allowing a user to log in to an education application of a server computer via a computing device using credentials of a user account of a social media Web site;

displaying on said computing device of said user a stated minimum of an age of said user account;

accessing said user account to quantify an age of said user account, said age indicating how long since said user account was established;

denying access to said resources of said education application by said computing device of said user when said quantity of said age of said user account is less than an actual minimum, said actual minimum not being revealed to said user and being greater than said stated minimum; and displaying on said computing device of said user an error message when said quantity is less than said actual minimum but greater than or equal to said stated minimum.

17. The method as recited in claim 16 wherein said education application is hosted within said social media Web site.

18. The method as recited in claim 16 wherein said resources include the ability of said user to view a video, electronic document, or a message board on said computing device.

19. A method of denying access to resources of an education application, said method comprising:

allowing a user to log in to an education application of a server computer via a computing device using credentials of a user account of a social media Web site;

accessing said user account to quantify a criterion of said user account that indicates that said user account is an actual account of said user;

denying access to said resources of said education application by said computing device of said user when said quantity of said criterion is less than an actual minimum, said actual minimum not being revealed to said user and being greater than a stated minimum of said criterion of said user account; and displaying on said computing device of said user said stated minimum when said quantity is less than said stated minimum.

20. The method as recited in claim 19 wherein said education application is hosted within said social media Web site.

21. The method as recited in claim 19 wherein said resources include the ability of said user to view a video, electronic document, or a message board on said computing device.

22. The method as recited in claim 19 wherein said criterion is a number of photographs, groups, or posts that are liked on said user account, a number of status updates of said user account, a number of logins to said user account over a period of time, a number of activities of said user account or a number of interactions of said user account with other applications.

23. A method of denying access to resources of an education application, said method comprising:
allowing a user to log in to an education application of a server computer via a computing device using credentials of a user account of a social media Web site;
displaying on said computing device of said user a stated minimum of a criterion of said user account that indicates that said user account is an actual account of said user;
accessing said user account to quantify said criterion of said user account that indicates that said user account is an actual account of said user;
denying access to said resources of said education application by said computing device of said user when said quantity of said criterion is less than an actual minimum, said actual minimum not being revealed to said user and being greater than said stated minimum; and
displaying on said a computing device of said user an error message when said quantity is less than said actual minimum but greater than or equal to said stated minimum.

24. The method as recited in claim 23 wherein said education application is hosted within said social media Web site.

25. The method as recited in claim 23 wherein said resources include the ability of said user to view a video, electronic document, or a message board on said computing device.

26. The method as recited in claim 23 wherein said criterion is a number of photographs, groups, or posts that are liked on said user account, a number of status updates of said user account, a number of logins to said user account over a period of time, a number of activities of said user account or a number of interactions of said user account with other applications.

27. The method as recited in claim 1 further comprising:
allowing access to said resources of said education application by said computing device of said user when said quantity of said number of social media links is greater than or equal to said actual minimum.

28. The method as recited in claim 27 further comprising:
displaying on said computing device of said user an error message when said quantity is less than said actual minimum but greater than or equal to said stated minimum.

29. The method as recited in claim 4 further comprising:
allowing access to said resources of said education application by said computing device of said user when said quantity of said number of social media links is greater than or equal to said actual minimum.

30. The method as recited in claim 7 further comprising:
allowing access to said resources of said education application by said computing device of said user when said quantity of said number of messages published is greater than or equal to said actual minimum.

31. The method as recited in claim 30 further comprising:
displaying on said computing device of said user an error message when said quantity is less than said actual minimum but greater than or equal to said stated minimum.

32. The method as recited in claim 13 further comprising:
allowing access to said resources of said education application by said computing device of said user when said quantity of said number of messages published is greater than or equal to said actual minimum.

33. The method as recited in claim 10 further comprising:
allowing access to said resources of said education application by said computing device of said user when said age of said user account is greater than or equal to said actual minimum.

34. The method as recited in claim 33 further comprising:
displaying on said computing device of said user an error message when said quantity is less than said actual minimum but greater than or equal to said stated minimum.

35. The method as recited in claim 16 further comprising:
allowing access to said resources of said education application by said computing device of said user when said age of said user account is greater than or equal to said actual minimum.

36. The method as recited in claim 19 further comprising:
allowing access to said resources of said education application by said computing device of said user when said quantity of said criterion is greater than or equal to said actual minimum.

37. The method as recited in claim 36 further comprising:
displaying on said computing device of said user an error message when said quantity is less than said actual minimum but greater than or equal to said stated minimum.

38. The method as recited in claim 23 further comprising:
allowing access to said resources of said education application by said computing device of said user when said quantity of said criterion is greater than or equal to said actual minimum.

* * * * *